Patented July 28, 1953

2,646,846

UNITED STATES PATENT OFFICE 2,646,846

WELL CEMENTING MATERIALS AND THEIR APPLICATION

Howard G. Cutforth, Bartlesville, Okla., assignor to Phillips Petroleum Company, a corporation of Delaware No Drawing. Application December 4, 1950, Serial No. 199,137

18 Claims. (Cl. 166—22)

This invention relates to well cementing materials. In one embodiment this invention relates to a method for cementing a well which extends into a porous formation. In another embodiment this invention relates to low water-loss cement slurries comprising a hydraulic cement, sufficient water to form a slurry, and an effective amount of an additive for reducing water-loss.

In the art of cementing oil wells and in grouting cracks in masonry structures there is a tendency for the cement slurry to lose water to such an extent that it becomes dehydrated, set, or cracked prematurely. The conventional method of cementing a pipe in a well is to force a cement slurry down the inside of the pipe. The cement emerges from the bottom of the pipe and passes upward in the well around the exterior of the pipe. If the walls of the bore hole are porous and the cement does not contain a water-loss reducing additive, so much water may pass from the cement slurry into the well wall as to cause the slurry to become set or so thickened as to be unpumpable, so that the cement cannot extend up the well outside the pipe to the desired distance. This undesirable dehydration is increased in many oil wells by the modern practice of scratching, or scraping the drilling mud from the wall of the well by mechanical means prior to placing the cement, which often exposes porous formations which will absorb the water from the slurry. This is particularly important when oil sands are penetrated. Artificial contamination of oil sands with water will often cause shaley impurities in the sand to swell and reduce the permeability of said oil sand to a very great extent. Therefore water lost from the slurry tends to seal off the formation to oil flow. When it is intended to cement with slurry, and then gun perforate the hardened cement, the gun perforator may not be able to penetrate into the region beyond that in which the shaley impurities are swollen by the water extracted from the slurry. In such cases the oil production rate of the well may be severely reduced by water contamination from the slurry.

In a real deep well, even when the walls of the well are non-porous, it takes such a long time to force the cement down the pipe and up the inside of the well that the setting time, or time of thickening to an unpumpable extent, becomes important. Obviously the cement must be placed before it becomes unpumpable.

I have discovered a method for preventing the filtration of water from cement slurries to the absorbent surrounding formations and the resulting contamination of such formations. I do this by adding to the cement slurry a small amount of a water-soluble alkali metal polyvinyl sulfate.

An object of this invention is to provide an improved cement slurry useful for grouting in general, for cementing the walls of wells, and for cementing pipe in wells. Another object is to provide a well cementing material which will not contaminate the earth formation in bore holes with water to any substantial degree. Another object is to provide a low water-loss cement slurry suitable for use in oil well cementing operations. Another object is to provide a low water-loss cement. Other objects and advantages will be apparent to one skilled in the art upon reading the accompanying specification and claims.

In preparing a cement slurry of my invention the dry ingredients, comprising hydraulic cement, with or without additives for increasing the time of set, the inert filler material, e. g., sand or crushed limestone, and the water-soluble alkali metal polyvinyl sulfate may be mixed together and later mixed with water alternatively. The polyvinyl sulfate additive material can be mixed separately with hot or cold water, and then added to the dry cement to form the slurry. The mixing of the hydraulic cement with water must, of course, be done promptly before placing the slurry in position.

By hydraulic cement I intend to include all mixtures of lime, silica, and alumina, or of lime and magnesia, silica, and alumina and iron oxide (magnesia, for example, may replace part of the lime, and iron oxide a part of the alumina) as are commonly known as hydraulic cements. Hydraulic cements include hydraulic limes, grappier cements, puzzolan cements, natural cements, and Portland cements. Puzzolan cements include slag cements made from slaked lime and granulated blast furnace slag. Because of its superior strength, Portland cement is preferred among the hydraulic cements. As defined in the art, e. g., see section 37, page 59, of "Hydraulic Cementing Materials in General—Introductory" from "Materials of Construction" by Adleburg P. Mills (1915), John Wiley and Sons, New York, hydraulic cements are recognized as a definite class, and as results of value may be obtained with any member of that class, it is intended to claim all hydraulic cements.

In most oil well cementing and grouting operations it is generally desirable to use neat cement for added strength, but, obviously, it is always possible to add a certain amount of an inert granular filling material of aggregate such as sand, ground limestone, or any of the other well known inert aggregates, as long as the amount added does not reduce the strength of the cement below the desired value. In operations in open wells it is often desirable to use neat cement, because inert filling material will automatically become detached from the walls of the well, and will tend to mix with and dilute the slurry to such an extent that it is undesirable to add any filling material to the slurry being forced into the well.

The amount of water added is not critical. It is obvious that sufficient water should be added to form a pumpable slurry, and that when the slurry becomes pumpable no further water need be added. One advantage of the low water-loss slurry of the present invention is that it is not necessary to add excess water over the amount needed for making the slurry pumpable. An additional amount as a reserve for expected losses would tend to reduce the strength of the cement.

I have found that the addition of a minor amount of a water-soluble alkali metal polyvinyl sulfate to the cement slurry reduces the rate of water-loss from the cement slurry to any water-absorbent medium with which the slurry is in contact. Such a polyvinyl sulfate compound has a general formula $$(R(OH)_{(1-n)}(OSO_3X)_n)_y$$

wherein R represents the vinyl alcohol nucleus, $$-CH_2-CH-$$

X represents an alkali metal atom such as sodium, potassium or lithium, $n$ is the average number of sulfate units in each treated vinyl alcohol nucleus, and $y$ is the number of vinyl alcohol nuclei in the molecule. Vinyl alcohol units, $$-CH_2-CH-$$
$$\phantom{-CH_2-}|$$
$$\phantom{-CH_2-}OH$$

can be joined together to form polyvinyl alcohol which has the general formula $$-CH_2CHCH_2CH-$$
$$\phantom{-CH_2}|\phantom{CHC}|$$
$$\phantom{-CH_2}OH\phantom{CH}OH$$

wherein there is shown two vinyl alcohol molecules joined together. Additional vinyl alcohol molecules can be joined to those shown at the available bonds at each end of the illustrated formula.

The alkali metal polyvinyl sulfate additive materials of this invention can be prepared by any suitable method but a very convenient manner of preparation is to react polyvinyl alcohol with a pyridine-sulfur trioxide complex in the presence of an ion-yielding material such as sodium chloride. This method of preparation is more fully described and claimed in the copending application of R. V. Jones, Serial No. 112,402, filed August 25, 1949, and the description contained therein for the preparation of these compounds is incorporated by reference into this application.

The number of sulfate groups introduced into the polyvinyl alcohol molecule is variable and will depend upon the specific reaction conditions employed and can be varied to suitably change the properties of the alkali metal poly- vinyl sulfate product. The average number of sulfate groups per vinyl alcohol unit present in the sulfated polyvinyl alcohol molecules is expressed as the degree of substitution. In the practice of this invention, it is preferred to employ an alkali metal polyvinyl sulfate having a degree of substitution within the range of 0.2 to 0.6, although higher or lower values, say 0.1 to 1.0 can be used when desired. As degrees of substitution are difficult to determine, I have found that the degree of substitution rendering the material water-soluble is a sufficient test for its utility. By water-soluble, I mean that it appears to be water-soluble to the eye, as whether it is a true solution or some sort of dispersion is not in question, the prior art referring to such materials as water-soluble. The material is of value to the extent that it is water-soluble, and border line substances may be used which are only partly or barely water-soluble, but better results are obtained when the material is clearly water-soluble. Howevever, it need not be water-soluble if it is soluble in the cement slurry, and all water-soluble materials of this nature are also soluble in the aqueous cement slurry plus less substituted materials that are not quite water-soluble, as the alkalinity of the cement aids in the solution.

My method is effective in reducing the water-loss from any hydraulic cement such as Portland cement or Starcor, which is a hydraulic cement having a retarded set. Starcor differs from Portland cement in that it contains $2CaO.Fe_2O_3$ instead of $3CaO.Al_2O_3$, and has a high ratio of di-calcium silicate to tri-calcium silicate, whereas Portland cement has a high ratio of tri-calcium silicate to the di-calcium silicate.

My water-loss reducing agents may be mixed with the cement before the addition of water, they may be added to the slurry at the time of mixing, or they may even be added to the water before the mixing of the cement slurry.

The amount of the alkali metal polyvinyl sulfate employed in the cementing material is not critical as even a small amount is effective, although to a correspondingly smaller degree. However, as a general rule, the amount of the alkali metal polyvinyl sulfate employed will generally fall within the range of from 0.1 to 3.0 weight per cent, based on the dry cement incorporated in the slurry. It will of course be understood by those skilled in the art that the exact amount of the alkali metal polyvinyl sulfate additive material employed to yield the desired reduction in water-loss in the cement can be varied from time to time and from well to well in accordance with existing conditions. In order to determine the optimum amount of alkali metal polyvinyl sulfate to be incorporated with the slurry in any particular well cementing operation, it is merely necessary to test samples of the slurry containing various amounts of the alkali metal polyvinyl sulfate in order to determine the rate of water-loss and to arrive at that amount of additive deemed necessary for use in the specific operation at hand.

Although the alkali metal polyvinyl sulfate water-loss reducing material of my invention can be applied to any hydraulic cement to retard the water-loss therefrom, my invention is particularly applied to sulfate-resistant type cements.

The advantages of this invention are illustrated in the following example. The reactants and their proportions and their specific ingredients are presented as being typical and should not be construed to limit the invention unduly.

Polyvinyl sulfate having an average degree of substitution of 0.46 sodium sulfate groups per vinyl alcohol unit was prepared by the interaction of polyvinyl alcohol with a pyridine-sulfur trioxide complex in the presence of sodium chloride. The resulting polyvinyl sulfate was incorporated with a sulfate resistant cement recognized by the art as a Type II cement and the resulting slurry tested for water-loss and thickening time. Another slurry the same as that discussed above except that it contained no polyvinyl sulfate additive was also tested for water-loss and thickening time. Another pair of tests were run similarly except that the cement in each case was a Portland cement commonly known as a "Type I" cement, which meets specifications for common Portland cement as used in the oil fields. The results of these tests are tabulated as follows:

| Test [1] | Cement, Type | Lbs./gal. of Slurry | Polyvinyl Sulfate, Percent Added | Loss,[2] Water | Thickening Time, 180 F., hours |
|---|---|---|---|---|---|
| 1 | II | 16.3 | 1 | 7.5/30 | 3.3 |
| 2 | II | 16.3 | 0 | Above 45/0.3 | 1.3 |
| 3 | I | 16.3 | 1 | 20/1.6 | 0.8 |
| 4 | I | 16.3 | 0 | 45/0.3 | 0.8 |

[1] At room temperature.
[2] Ml. per minute.

As will be evident to those skilled in the art, various modifications can be made or followed, in the light of the foregoing disclosure and discussion, without departing from the spirit or scope of the disclosure or from the scope of the claims.

I claim:

1. The process of producing a hydraulic cement aqueous slurry having a reduced water-loss to porous formations, which comprises admixing from 0.1 to 3.0 per cent of a water-soluble alkali metal polyvinyl sulfate with a hydraulic cement based on the dry weight of said cement, and mixing the resulting admixture with sufficient water to produce a fluid slurry.

2. The process of producing a hydraulic cement aqueous slurry having a reduced water-loss to porous formations, which comprises admixing a hydraulic cement with a relatively minor proportion of a water-soluble alkali metal polyvinyl sulfate and with sufficient water to produce a resulting fluid slurry.

3. The process of cementing a well which extends into a porous formation, comprising forming a hydraulic cement aqueous slurry having a reduced water-loss, by admixing a hydraulic cement with from 0.1 to 3.0 per cent of its dry weight, of a water-soluble alkali metal polyvinyl sulfate and with sufficient water to produce a resulting fluid slurry, and introducing said resulting slurry into said well into contact with said porous formation.

4. The process of cementing a well which extends into a porous formation which comprises forming a hydraulic cement aqueous slurry having a reduced water-loss by admixing a hydraulic cement with a relatively minor proportion of a water-soluble alkali metal polyvinyl sulfate and with sufficient water to produce a resulting fluid slurry, and introducing said resulting slurry into said well in contact with said porous formation.

5. The process of claim 1 wherein said polyvinyl sulfate is a water-soluble sodium polyvinyl sulfate.

6. The process of claim 1 wherein said polyvinyl sulfate is a water-soluble potassium polyvinyl sulfate.

7. The process of claim 1 wherein said polyvinyl sulfate is a water-soluble lithium polyvinyl sulfate.

8. A cement capable of forming a fluid slurry when mixed with water, said cement comprising a hydraulic cement mixed with a minor proportion of a water-soluble alkali metal polyvinyl sulfate.

9. A hydraulic cement slurry comprising a hydraulic cement, water, and a minor proportion of a water-soluble alkali metal polyvinyl sulfate.

10. A cement capable of forming a fluid slurry when mixed with water, said cement comprising a hydraulic cement mixed with from 0.1 to 3.0 per cent of its dry weight of a water-soluble alkali metal polyvinyl sulfate.

11. A cement of claim 10 wherein said hydraulic cement is a Portland cement.

12. The hydraulic cement slurry of claim 9 containing said water-soluble polyvinyl sulfate in an amount of from 0.1 to 3.0 per cent, based on the dry weight of said cement.

13. The hydraulic cement slurry of claim 12 wherein said polyvinyl sulfate is a water-soluble sodium polyvinyl sulfate.

14. The hydraulic cement slurry of claim 12 wherein said polyvinyl sulfate is a water-soluble potassium polyvinyl sulfate.

15. The hydraulic cement slurry of claim 12 wherein said polyvinyl sulfate is a water-soluble lithium polyvinyl sulfate.

16. A cement of claim 10 containing a water-soluble sodium polyvinyl sulfate as said polyvinyl sulfate.

17. A cement of claim 10 containing a water-soluble potassium polyvinyl sulfate as said polyvinyl sulfate.

18. A cement capable of forming a fluid slurry when mixed with water, said cement comprising a Type II cement mixed with from 0.1 to 3.0 per cent of its dry weight of a water-soluble sodium polyvinyl sulfate.

HOWARD G. CUTFORTH.

References Cited in the file of this patent

UNITED STATES PATENTS

| Number | Name | Date |
|---|---|---|
| 2,188,767 | Cannon et al. | Jan. 30, 1940 |